United States Patent [19]
Lake

[11] Patent Number: 6,100,805
[45] Date of Patent: Aug. 8, 2000

[54] DEVICES FOR SENSING TERMITES AND OTHER LIVING ORGANISMS, AND METHODS OF FORMING DEVICES FOR SENSING TERMITES

[75] Inventor: Rickie C. Lake, Eagle, Id.

[73] Assignee: Micron Technology, Inc., Boise, Id.

[21] Appl. No.: 09/373,884

[22] Filed: Aug. 12, 1999

[51] Int. Cl.$^7$ .................................................. G08B 23/00
[52] U.S. Cl. ........................ 340/573.1; 340/540; 342/51; 43/132.1
[58] Field of Search ................................. 340/573, 573.1, 340/573.2, 540; 43/132.1; 342/51

[56] References Cited

U.S. PATENT DOCUMENTS

| | | | |
|---|---|---|---|
| 4,136,338 | 1/1979 | Antenore | 340/551 |
| 4,737,789 | 4/1988 | Nysen | 342/51 |
| 4,951,057 | 8/1990 | Nagel | 342/51 |
| 5,428,345 | 6/1995 | Bruno | 340/550 |
| 5,571,967 | 11/1996 | Tanaka et al. | 73/587 |
| 5,648,758 | 7/1997 | Tweadey, II et al. | 340/550 |
| 5,974,344 | 10/1999 | Shoemaker, II | 607/149 |

OTHER PUBLICATIONS

Website: Dow AgroSciences, "Sentricon Colony Elimination System", 1998, 7 pgs.
U.S. application No. 08/705,043, O'Toole et al., filed Aug. 29, 1996.

*Primary Examiner*—Jeffery A. Hofsass
*Assistant Examiner*—Daniel Previl
*Attorney, Agent, or Firm*—Wells, St. John, Roberts, Gregory & Matkins, P.S.

[57] ABSTRACT

The invention encompasses a living organism sensing device. Such device comprises a conductive loop extending over a substrate. The loop comprises carbon particles. The device further comprises a circuit which includes the conductive loop as a first circuit component and a transponder as a second circuit component. The transponder is configured to emit a first signal if the loop of conductive material is continuous and a second signal if the loop of conductive material is broken. The second signal is different than the first signal. The invention also encompasses a termite sensing device. Such device includes at least one wooden block, and a conductive loop proximate the wooden block. The loop comprises conductive particles of carbon. The termite sensing device further includes an electrical circuit comprising the conductive loop as a first circuit component and a transponder as a second circuit component. The transponder is configured to emit a first signal if the conductive loop is continuous and a second signal if the loop is broken. The second signal is different than the first signal.

16 Claims, 11 Drawing Sheets

DEVICES FOR SENSING TERMITES AND OTHER LIVING ORGANISMS, AND METHODS OF FORMING DEVICES FOR SENSING TERMITES

TECHNICAL FIELD

The invention pertains to devices for sensing living organisms, such as, for example, devices for sensing termites. The invention also pertains to methods of forming devices for sensing termites.

BACKGROUND OF THE INVENTION

A prior art apparatus and method for detecting termite infestation is described with reference to FIGS. 1 and 2. A termite detection device 10 is shown in an assembled configuration and inserted within the ground 12 in FIG. 1, and is shown in a disassembled configuration in FIG. 2. Device 10 comprises an outer receptacle 14 having a plurality of orifices 16 (only some of which are labeled) extending therethrough. A cap (or lid) 18 is provided to cover the top of receptacle 14. Preferably receptacle 14 is inserted into the ground to a depth at which cap 18 will rest approximately at a surface of the ground.

A pair of wooden blocks 20 and 22 are provided within receptacle 14, and constitute "bait" for termites proximate device 10. A holder 24 is provided between blocks of wood 20 and 22 and comprises a shelf 26 upon which blocks 20 and 22 rest. Holder 24 and blocks 20 and 22 together comprise an assembly 27 which can be removably inserted into receptacle 14.

Holder 24 comprises a portion 28 which protrudes upwardly beyond blocks 20 and 22 in the assembled configuration of FIG. 1. Portion 28 comprises an eye 30 (shown in FIG. 2) which can simplify removal of assembly 27 from receptacle 14 using a tool with a hook.

In operation, receptacle 14 is inserted into ground 12, and blocks 20 and 22 are subsequently left in receptacle 14 for a period of time. Blocks 20 and 22 function as a sensing apparatus to determine if a termite infestation is present in an area proximate device 10. Specifically, if termites are present, such will penetrate through orifices 16 to reach wooden blocks 20 and 22. The termites will then burrow into the wooden blocks 20 and 22.

At regular intervals, cap 18 is removed and blocks 20 and 22 withdrawn from device 14. Blocks 20 and 22 are then surveyed for termite-inflicted damage, and possibly the presence of termites themselves.

Generally, a number of apparatuses 10 will be spread around a given location, such as, for example, a house or other wooden structure. Each of the apparatuses will be checked at a regular interval to determine if a termite infestation is occurring proximate the structure. Also, each of the devices will be mapped relative to one another, and relative to the structure. A comparison of the amount of termite-inflicted damage occurring at the respective devices 10 can then enable a person to determine an approximate localized region of any occurring termite infestation. It can be advantageous to pinpoint a localized region of infestation as such can limit an amount of pesticide utilized for destroying the termites.

Difficulties can occur in monitoring the amount of termite-inflicted damage occurring at each of the many devices 10 provided around a structure. For instance, it can be difficult to regularly and accurately document the amount of damage at each of the devices. As an example, it can be difficult to remember exactly which of the various devices correlates to a specific location on a map of the devices. As another example, it can be difficult to accurately record a reading of termite-inflicted damage associated with an individual device. As yet another example it can be tedious and time-consuming to open all of the receptacles 14 proximate a given structure and manually check the blocks 20 and 22 within the receptacles for termite-inflicted damage.

One method of reducing the above-discussed difficulties is to provide bar codes on the lids 18 of receptacles 14. Such bar codes can be scanned to specifically identify a particular device which can simplify correlating the devices to locations on a map of the devices. However, ascertaining an amount of termite-inflicted damage can still be time-consuming in that the receptacles still have to be opened and the blocks of wood manually checked to determine if termite-inflicted damage has occurred to the wood.

A recently proposed improvement for monitoring an amount of termite-inflicted damage in a device similar to device 10 is described with reference to FIGS. 3–5. Referring to FIG. 3, a sensor 40 having circuitry 41 provided thereon is provided in addition to, or in place of, the blocks of wood 20 and 22 (FIGS. 1 and 2). Sensor 40 is intended to be bent into receptacle 14 (a bent configuration is shown in FIG. 4) and to be configured such that termite-inflicted damage to sensor 40 will break the circuitry associated therewith. Sensor 40 can have a number of notches (not shown) provided therein to provide crevices for termites to burrow in.

It is suggested that a printed wiring board 42 can be provided in electrical connection with sensor 40, and that such printed board can comprise circuitry corresponding to a transponder unit. The transponder unit could, for example, comprise a parallel resonant LC circuit, with such circuit being resonant at a carrier frequency of an interrogator. Such transponder unit can be incorporated into a passive, read-only radio frequency identification device (RFID) system as described with reference to FIG. 5. Specifically, FIG. 5 illustrates an RFID system 60 comprising the transponder unit of printed wiring board 42 and an interrogator 45 configured to be passed over a transponder comprised by printed wiring board 42. Interrogator 45 comprises a coil antenna configured to stimulate the transponder unit. Such coil antenna consists of one or more coils of conductive material provided within a single plane, and can be in the form of, for example, a loop antenna.

In operation, interrogator 45 provides a carrier signal which powers (stimulates) transponder unit of printed wiring board 42 and causes a signal to be transmitted from the transponder unit. The signal comprises data which identifies the transponder unit. Such signal can also identify if the circuitry associated with sensor 40 has been broken. The signal is received by interrogator 45, and eventually provided to a processing system configured to decode and interpret the data. Such processing system can be provided in a portable unit with interrogator 45, or can be provided in a separate unit to which data from interrogator 45 is subsequently downloaded.

SUMMARY OF THE INVENTION

In one aspect, the invention encompasses a living organism sensing device. Such device comprises a conductive loop extending over a substrate. The loop comprises carbon particles. The device further comprises a circuit which includes the conductive loop as a first circuit component and a transponder as a second circuit component. The transponder is configured to emit a first signal if the loop of conductive material is continuous and a second signal if the loop of conductive material is broken. The second signal is different than the first signal.

In another aspect, the invention encompasses a termite sensing device. Such device includes at least one wooden block, and a conductive loop proximate the wooden block. The loop comprises conductive particles of carbon. The termite sensing device further includes an electrical circuit comprising the conductive loop as a first circuit component and a transponder as a second circuit component. The transponder is configured to emit a first signal if the conductive loop is continuous and a second signal if the loop is broken. The second signal is different than the first signal.

In yet another aspect, the invention encompasses a method of forming a termite sensing device. A conductive loop is formed over a substrate by printing in ink on the substrate. The ink comprises carbon particles. The loop is placed between a pair of wooden blocks. A transponder is provided in electrical connection with the loop of conductive material and configured to transpond a first signal if the loop is broken and a second signal if the loop is not broken. The first signal is different than the second signal.

BRIEF DESCRIPTION OF THE DRAWINGS

Preferred embodiments of the invention are described below with reference to the following accompanying drawings.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention pertains to improved devices for sensing changes in an environment proximate the devices. The changes in the environment can include, for example, changes in pressure, force, shock, temperature, or organism concentration (with the term "organism" encompassing all living creatures and including plants, bacteria, insects, birds and mammals). Changes in pressure, force, shock and temperature can be detected by, for example, providing circuitry configured to change from a closed circuit configuration to an open configuration when a trip point is passed. For instance, pressure and force can be detected by incorporating a pressure transducer or accelerometer into the circuitry. In particular aspects, the invention pertains to devices configured to sense a change in a pest concentration proximate the devices. In more particular aspects, the invention pertains to devices configured to sense termite infestation.

Figure 1:
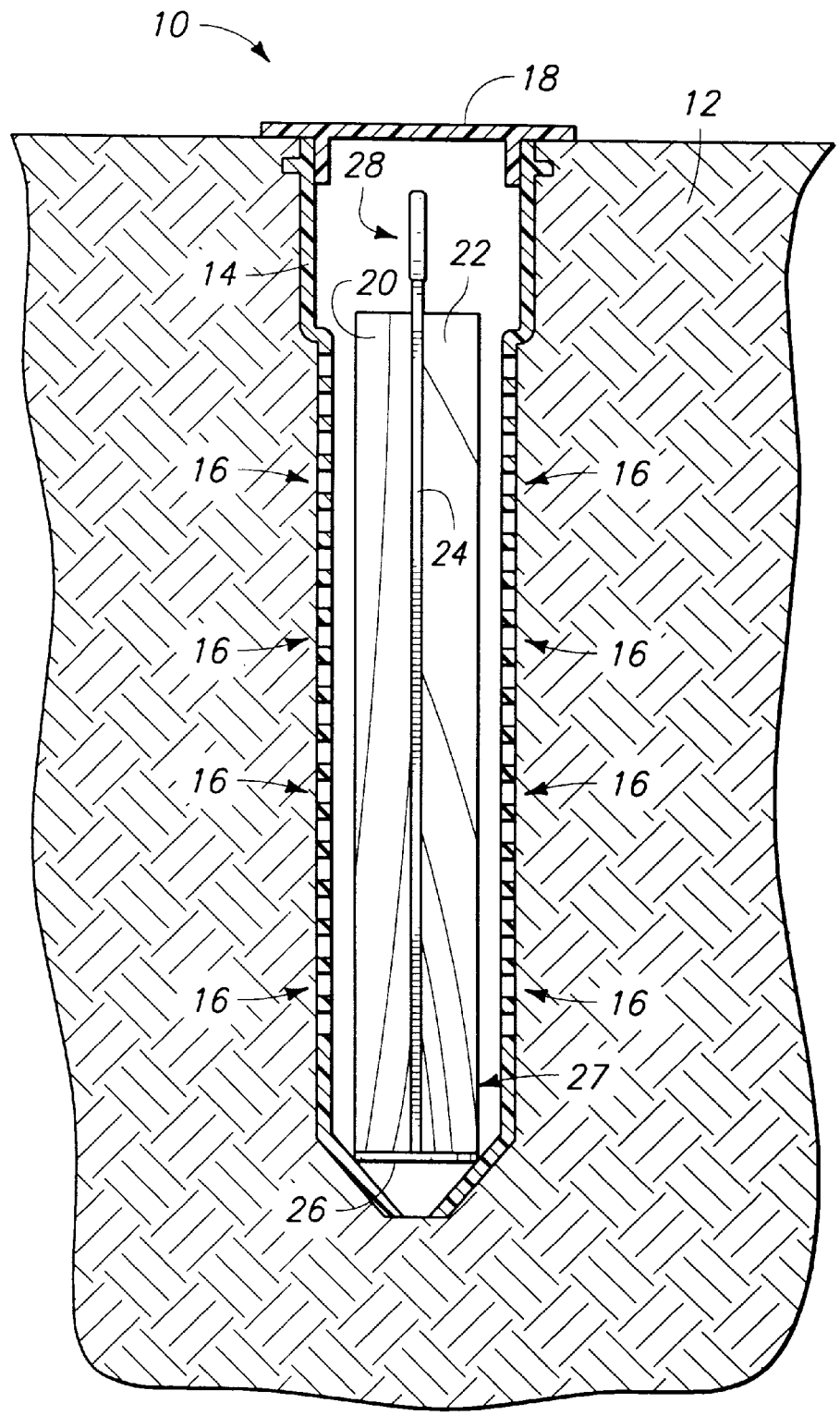
FIG. 1 is a diagrammatic, cross-sectional view of an assembled prior art termite sensing device embedded in the ground.
Figure 2:
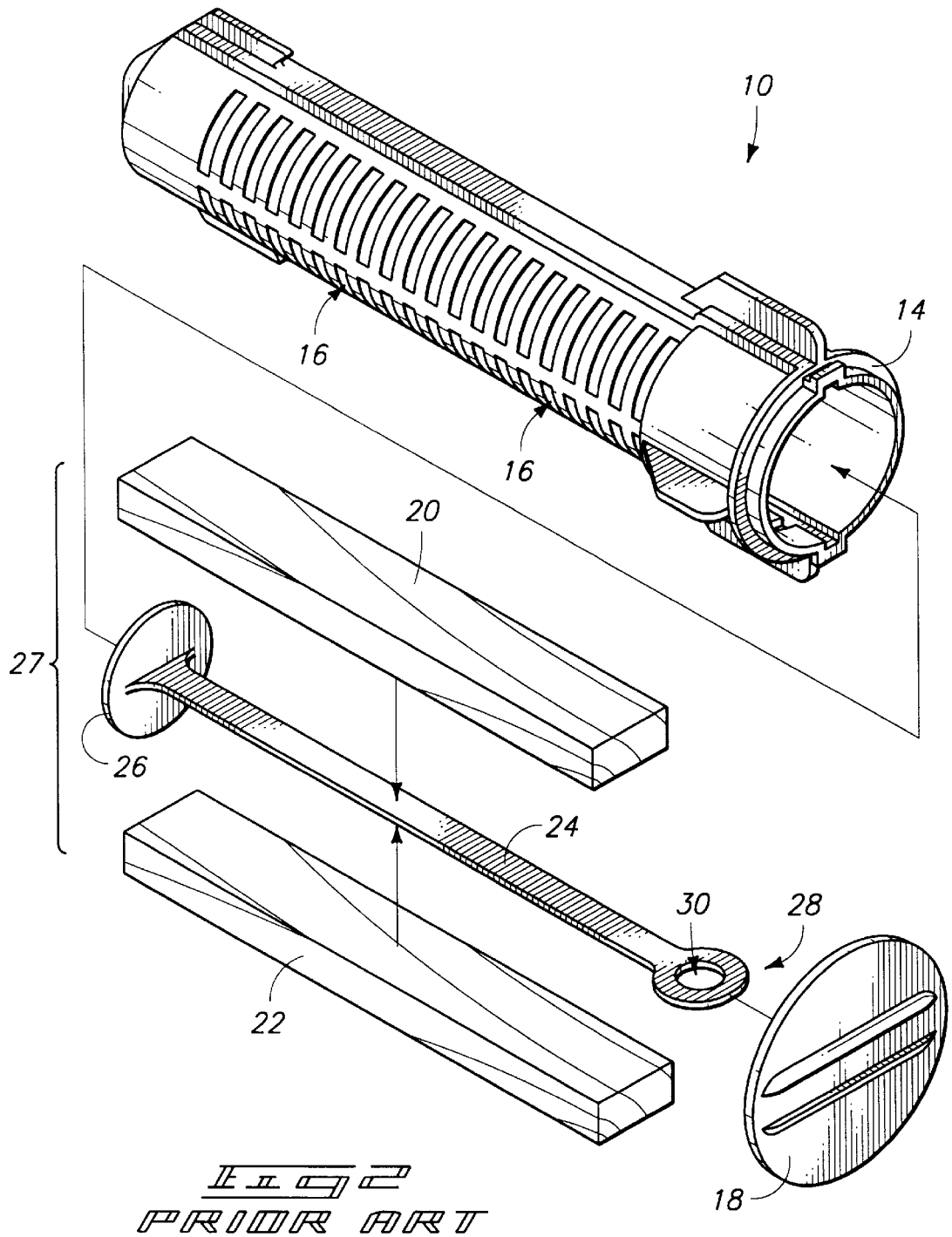
FIG. 2 is a perspective view of the prior art termite sensing device of FIG. 1 in a disassembled configuration.

A first embodiment device 100 of the present invention is described with reference to FIG. 6. Device 100 comprises a receptacle 14 of the type described above with reference to the prior art, and comprises a cap 18 configured to be received over an open top of receptacle 14. Device 100 further comprises a pair of wooden blocks 20 and 22 of the type described above with reference to the prior art, and a holder 110 similar to the holder 24 described above with reference to the prior art embodiment of FIG. 1. Holder 110 can comprise, for example, plastic. Holder 110 differs from holder 24 in that holder 110 comprises a top shelf 112 in addition to a bottom shelf 114, whereas holder 24 only comprised a bottom shelf. In the shown embodiment, shelf 112 is configured with a slit 116 so that shelf 112 can be slid over a prior art holding device (such as the device 24 of FIG. 1) to form the holding device 110 of the present invention. Slit 116 is, of course, optional, and the invention encompasses other embodiments (not shown) wherein shelf 112 is molded in one piece with the other components of holder 110. Holder 110 can be considered as comprising a pillar 111 extending between shelves 112 and 114, and an extension 113 protruding above shelf 112. Extension 113 is configured to enable a person to lift holder 110 by the extension, and in the shown embodiment comprises an eye extending therethrough. Shelf 112 preferably comprises an electrically insulative material, such as, for example, plastic (for instance, polypropylene).

Device 100 further comprises an electronic termite sensing loop 118 of conductive material. In the shown embodiment, loop 118 is formed on a substantially planar substrate 120. Loop 118 is preferably formed of a material which can be removed by termites. Exemplary materials are printable materials comprising conductive particles, such as, for example metal particles or carbon particles. Suitable materials are, for example, silver-filled printed thick film ink and silver-filled epoxy. An exemplary silver-filled ink is Dupont Electronics 5028™ (available from Dupont Electronics of Wilmington, Del.), which is a silver polymer conductor.

A material that can be preferred for utilization in forming conductive loop 118 is a carbon-particle-containing ink (typically the particles will consist essentially of carbon), such as, for example, a material marked by Dupont Electronics as 7102™ Carbon Polymer Conductor (available from Dupont Electronics of Wilmington, Del.). The carbon-particle-containing ink can be screen printed onto substrate 120 to form loop 118.

Among the advantages of utilizing a carbon-particle-containing ink (relative to other materials, such as, for example, silver-filled inks) is that the carbon-particle-containing inks can be cheaper than other inks, better accepted by pests (i.e., apparently more palatable to the pests), and less subject to environmental damage. Further, the inclusion of carbon inks in a circuit can lower an electrical conductivity (i.e., raise a resistivity) of the circuit. The lowered conductivity can increase the reliability of data obtained from the circuit. More specifically, circuit 118 is utilized to detect termites by determining when the circuit is broken (with a broken circuit being referred to as a positive reading, and an indication of termite inflicted damage). The inclusion of carbon-particle-containing inks in loop 118 can render the circuit of loop 118 less susceptible to registering false negative readings if mud or water bridges an opening in the circuit. For example, if loop 118 is included in a circuit designed to indicate a break (or severance in the circuit) at a circuit resistance of 2 million ohms, and if the loop comprises a material with a resistance substantially less than 2 million ohms, a false negative status may be obtained if mud or water is bridging a severed circuit. However, if loop 118 comprises a printed material with a resistance about equal to the triggering resistance of 2 million ohms, a bridge of water or mud will increase resistance to over the triggering resistance.

It is noted that carbon-particle-containing inks can be utilized alone (such that the conductive material of loop 118 consists essentially of carbon particles), or can be utilized in combination with other conductive materials (such as, for example, silver-filled inks). The utilization of a combination of carbon-particle-containing inks and metal-filled inks can enable a resistance of loop 118 to be adjusted to a desired value.

The material of loop 118 can be formed by combining one or more of carbon-particle-containing ink, a metal-containing ink, and a dielectric material ink to form a resultant ink of desired electrical properties for loop 118. Such resultant ink can be screen-printed onto substrate 120 to form loop 118. The dielectric ink can comprise, for example, Dupont Electronics 5018™ UV curable dielectric (available from Dupont Electronics of Wilmington, Del.).

Substrate 120 is preferably formed of material which can be removed by termites. Exemplary materials are polyethylene foam and polyester. The conductive material of loop 118 can be directly applied to substrate 120 using, for example, screen printing methods. Substrate 120 can be pretreated prior to applying the conductive material of loop 118 over substrate 120. Such pretreatment can comprise, for example, flame pretreatment to promote adhesion of the conductive material to the foam.

Figure 6:
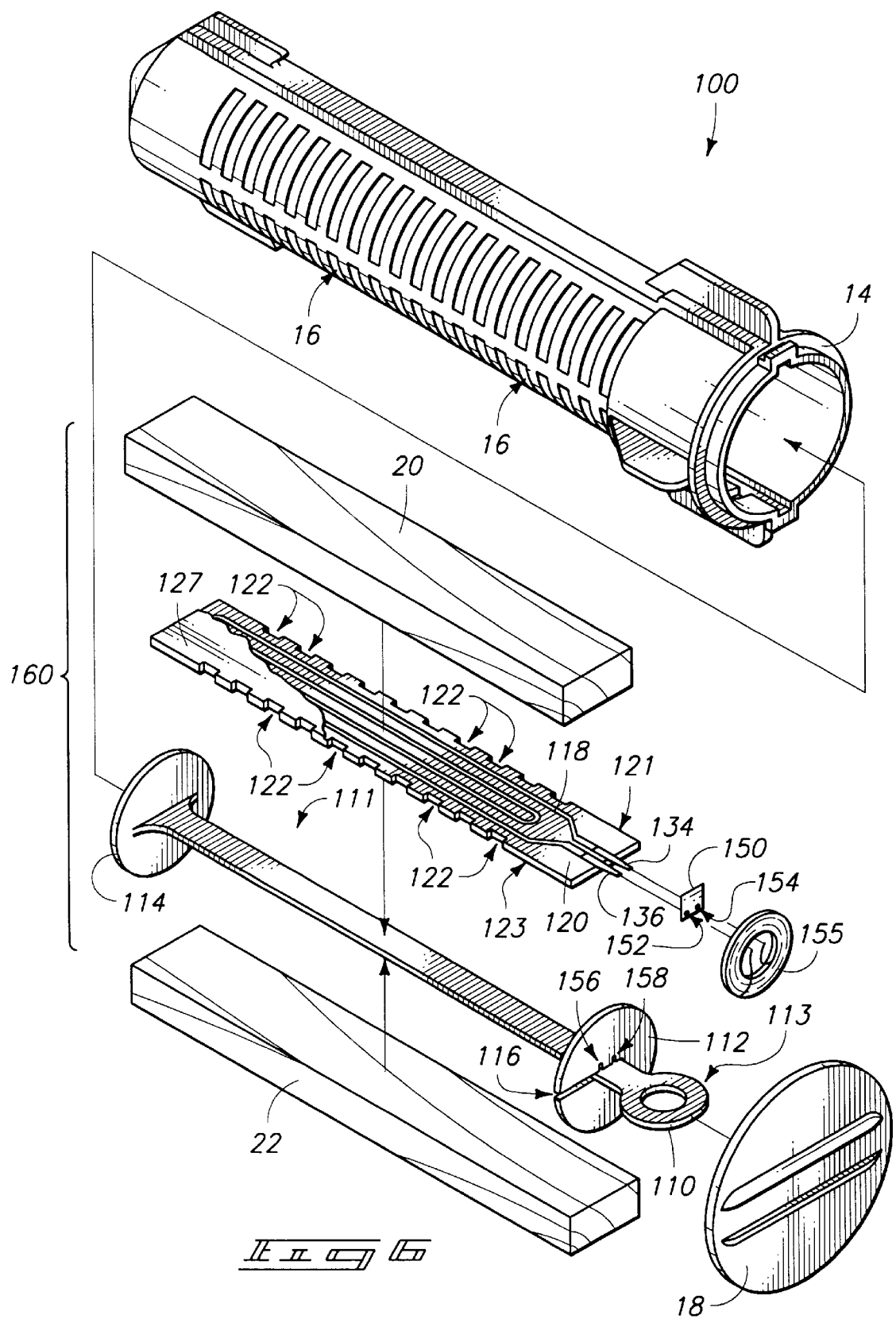
FIG. 6 is a diagrammatic, perspective view of a disassembled termite sensing device of the present invention.
Figure 7:
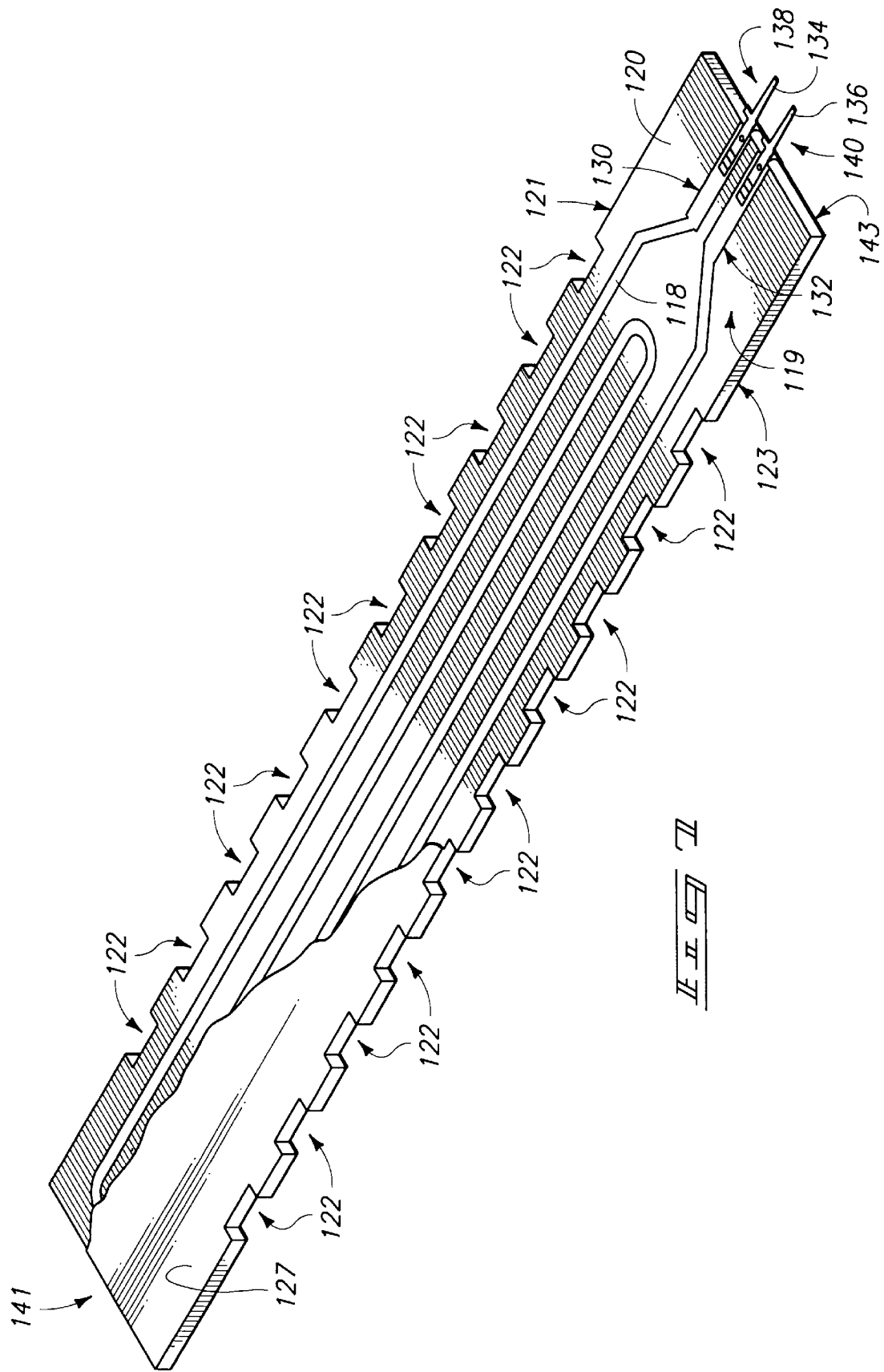
FIG. 7 is a perspective view of an electronic sensing component of the device of FIG. 6.

An electrically insulative protective material 127 (only some of which is shown in FIGS. 6 and 7) is provided over loop 118 and substrate 120 to, for example, assist in retaining conductive loop 118 on substrate 120 and protect conductive loop 118 from water, abrasion or other environmental damage. The insulative protective material can comprise a material which is provided as a liquid and subsequently cured to form a hardened and electrically insulative material, or can comprise a solid adhered over the conductive loop 118. The insulative protective material can comprise, for example, a resin which is provided as a liquid and cured by exposure to one or more of heat, ultraviolet light and oxygen. A suitable insulative protective material is a material selected from the general class of epoxy resins (such as, for example, a two-part epoxy resin). Another suitable insulative protective material is a material selected for the general class of thick film inks. Exemplary insulative protective materials are Dupont 5015™ and 5018™ (available from Dupont Electronics of Wilmington, Del.), with 5018™ being an ultraviolet light curable dielectric material. Another exemplary insulative protective material is a tape adhered over loop 118 with an adhesive.

A termite attractant (such as, for example, a suitable pheromone) can be provided in addition to the insulative protective material. Such attractant can, for example, be formed over the insulative protective material or blended within the insulative protective material. For instance, in embodiments in which the insulative protective material comprises a material which is initially provided as a liquid, the attractant can be blended within the liquid insulative protective material. In other embodiments, the attractant can be provided in a solution which is sprayed or printed over a solid insulative protective material.

In the shown configuration, substrate 120 comprises a pair of opposing sidewall edges 121 and 123, and a plurality of notches 122 extending into sidewall edges 121 and 123. Notches 122 are provided to form crevices within which the termites can burrow.

Conductive sensing loop 118 and substrate 120 are shown in an exploded view in FIG. 7. As can be seen in such view, conductive loop 118 comprises a pair of ends (130 and 132). End 130 is connected to a first prong 134, and end 132 is connected to a second prong 136. Prongs 134 and 136 comprise conductive materials, such as, for example, metal, and can alternatively be referred to as conductive extensions.

Substrate 120 comprises a surface 119, and such surface defines a plane along which conductive sensing loop 118 extends. Sensing loop 118 is thus a planar conductive loop. Prongs 134 and 136 extend along surface 119, and accordingly extend along the plane defined by surface 119. Further, prongs 134 and 136 comprise portions 138 and 140, respectively, which extend beyond surface 119, but which continue to extend along the plane defined by surface 119.

In the shown embodiment, substrate 120 comprises a generally rectangular shape, having opposing sides 121 and 123, and opposing ends 141 and 143. Prongs 134 and 136 extend outwardly from end 143.

Referring again to FIG. 6, device 100 further comprises a circuit board 150 having circuitry (not shown in FIG. 6) supported thereby and a pair of orifices (152 and 154) extending therethrough. Board 150 can be considered as a circuit support. Shelf 112 has a pair of orifices 156 and 158 extending therethrough, and configured to be aligned with orifices 152 and 154 of circuit board 150. In operation, device 100 is assembled by providing substrate 120 within holder 114 such that prongs 134 and 136 extend through orifices 156, 158, 152 and 154 to retain circuit board 150 atop shelf 112. Circuit board 150 can then be adhered to shelf 112 and/or prongs 134 and 136. In an exemplary embodiment, circuit board 150 is adhered to prongs 134 and 135 with solder. Blocks 20 and 22 are subsequently provided within holder 110 to form an assembly 160 which can be removably inserted within receptacle 14. In alternative terminology, assembly 160 can be referred to as a composite block 160 which comprises wooden blocks 20 and 22, and planar sensing loop 118. Composite block 160 comprises an outer periphery extending around edges 121, 123, 141 and 143 of substrate 120, and prongs 134 and 136 extend outwardly from such outer periphery.

Figure 5:
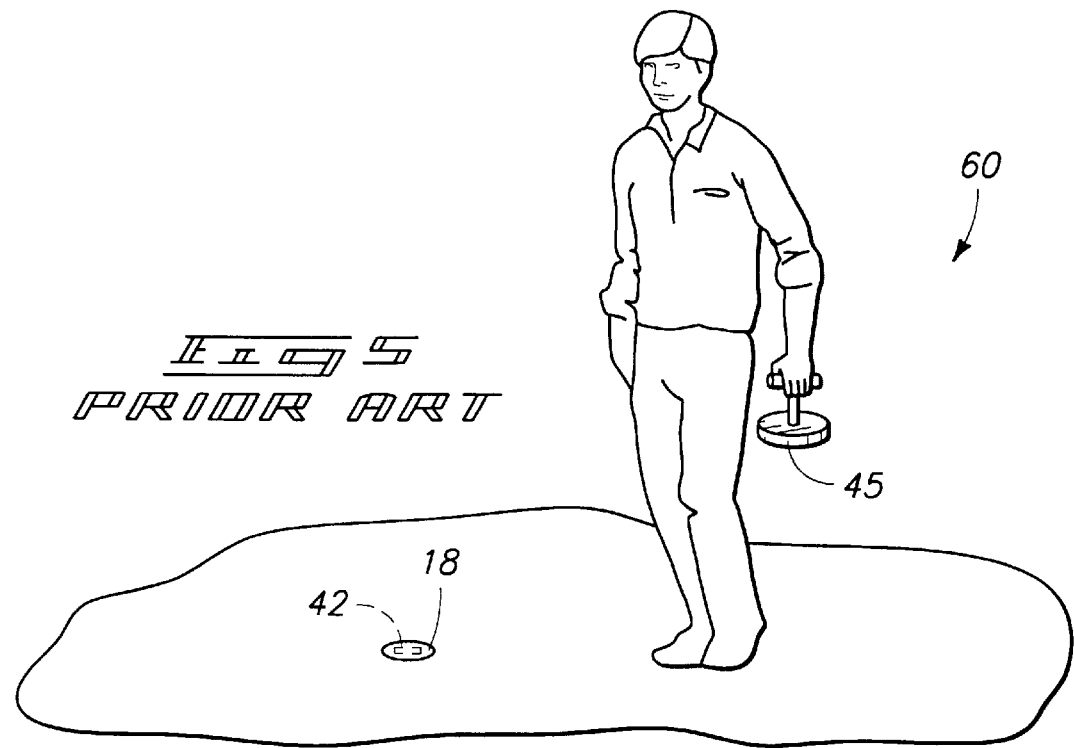
FIG. 5 is a diagrammatic view of a person extracting information from the prior art electronic termite sensing device of FIG. 3.

In preferred embodiments, the circuitry supported by circuit board 150 comprises at least a portion of a transponder unit and is configured to be incorporated into a passive RFID system. A suitable transponder unit can comprise an antenna, capacitor and circuit. In the shown embodiment, an antenna 155 is provided externally of the circuitry supported by board 150. A suitable circuit board/transponder unit assembly can be constructed utilizing methodology described in U.S. patent application Ser. No. 08/705,043, filed Aug. 29, 1996, which is assigned to the assignee of the present invention and hereby incorporated by reference. An interrogator (such as the interrogator 45 of FIG. 5) can be passed over the transponder unit associated with board 150 to cause a signal to be sent from the transponder unit to the interrogator. In such preferred applications, a loop antenna (not shown) can be provided on shelf 112 and in electrical connection with the transponder unit.

A signal sent from the transponder unit associated with board 150 to the interrogator can identify the particular transponder unit, and can also identify if conductive loop 118 is broken (i.e., if the conductive loop has changed from being a closed circuit component to being an open circuit component). For instance, the transponder unit can be configured such that a break in circuit 118 will change an ID number of the transponder unit. As an example, the transponder unit can be configured to have a normal ID number of 12345 and be configured such that opening of circuit 118 will change such number to 54321. Alternatively, the transponder unit can be configured such that a break in circuit 118 will transpose the first and last ID numbers of the transponder, the first two numbers of the transponder, the last two numbers of the transponder unit, etc.

By having a signal from the transponder unit change with a break in circuit 118, device 100 can indicate if damage has occurred to loop 118 through a signal sent to an interrogator. Such can enable persons utilizing the device to ascertain if termites are present without having to remove blocks 20 and 22 from receptacle 14, and even without having to remove the lid 18 from receptacle 14. Once damage to circuit 118 is detected with an interrogator, persons can remove assembly 160 and quantitate an amount of damage occurring within blocks 20 and 22 to determine an extent of a termite infestation.

Figure 8:
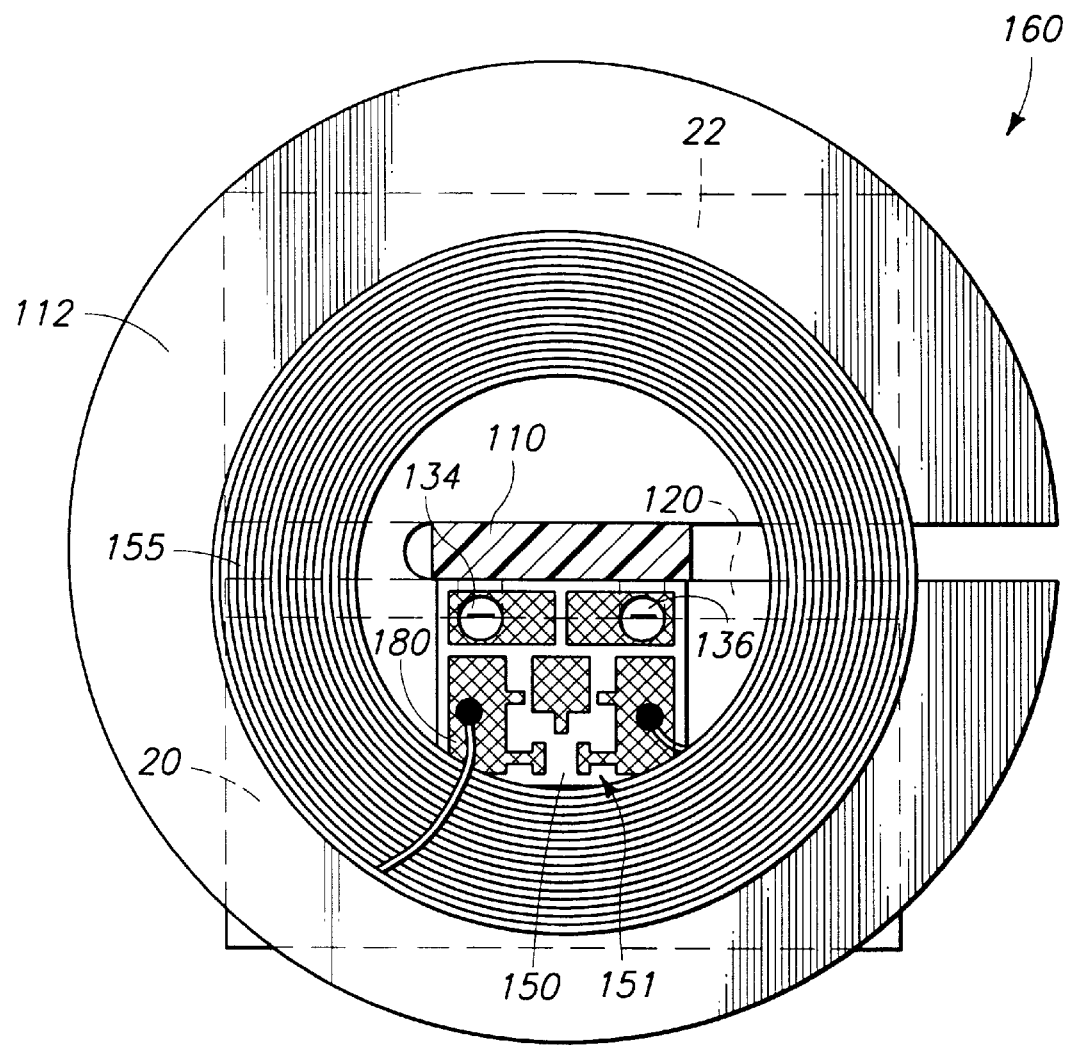
FIG. 8 is a diagrammatic end view of an assembled portion of the device of FIG. 6.

A preferred orientation of circuit board 150 relative to substrate 120 is shown in FIG. 8. Specifically, FIG. 8 illustrates a top, cross-sectional view of assembly 160. The cross-sectional view extends through holder 110 at a location above shelf 112. In such view it can be seen that circuit board 150 rests upon shelf 112. Circuit board 150 comprises a planar upper surface 151 and circuitry 180 upon such surface. Circuitry 180 accordingly extends along a plane defined by surface 151. Substrate 120 (shown in phantom) extends downwardly into assembly 160. Accordingly, the surface 119 (FIG. 7) of substrate 120 extends perpendicularly to the surface 151 of circuit board 150. As the loop of sensing circuitry 118 (FIG. 7) extends along a plane defined by surface 119 (FIG. 7) of substrate 120, and as transponder circuitry 180 extends along a plane of upper surface 151 of circuit board 150, transponder circuitry 180 extends along a plane perpendicular to the plane along which sensing loop 118 (FIG. 7) extends.

Figure 3:
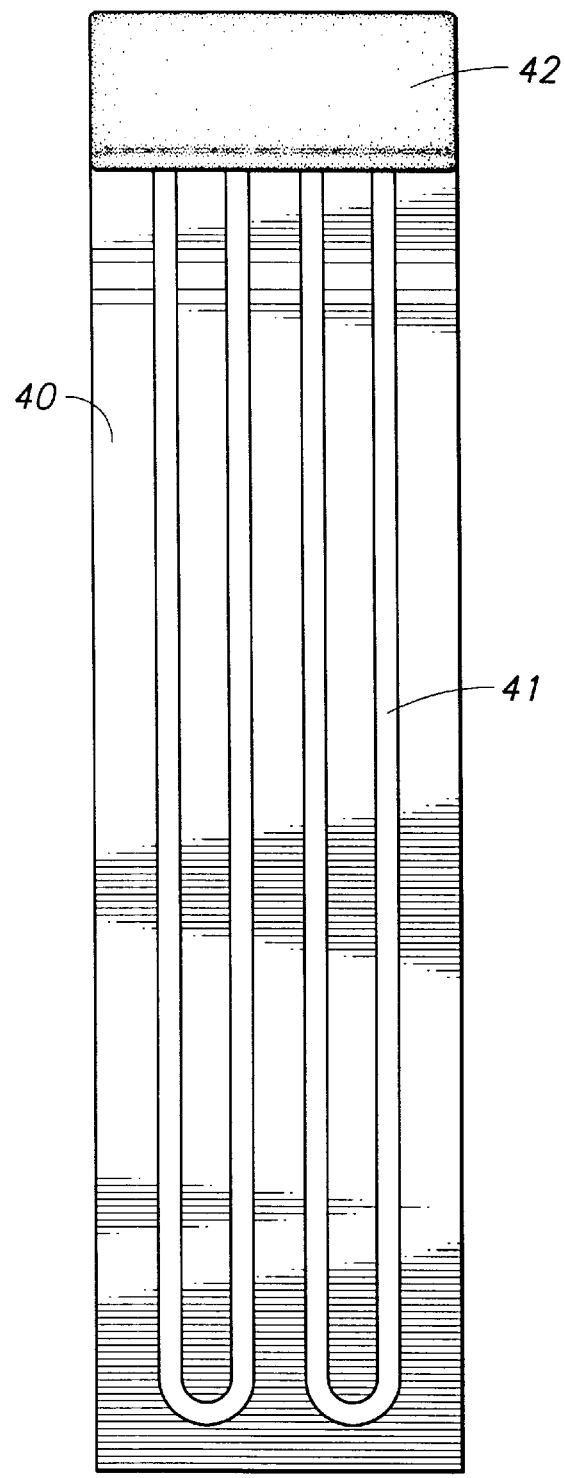
FIG. 3 is a diagrammatic side view of a prior art electronic sensor configured to detect termite infestation.
Figure 4:
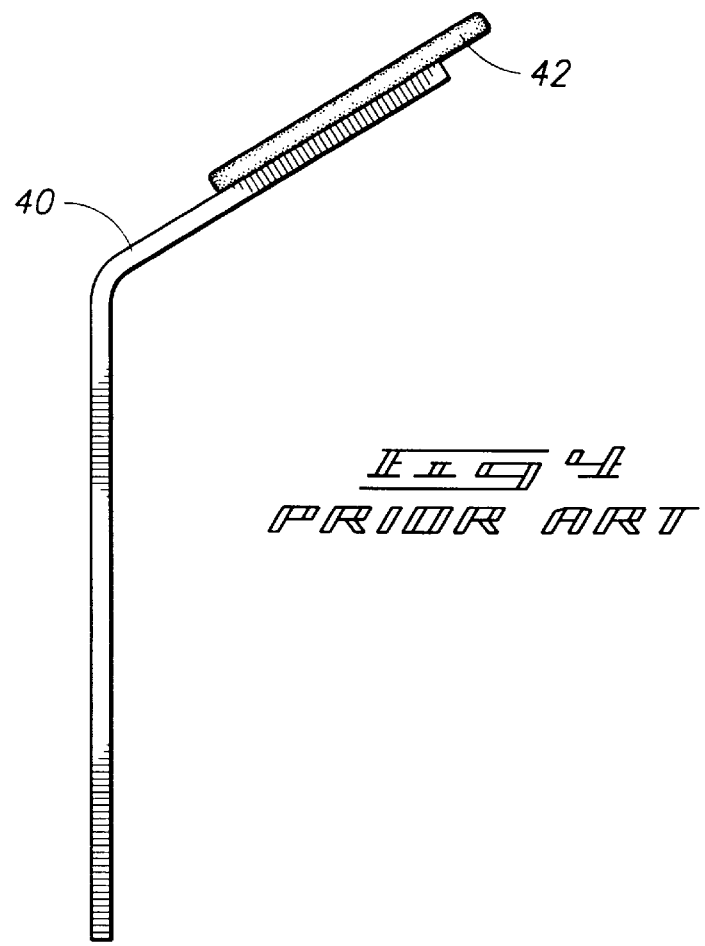
FIG. 4 is a diagrammatic side view of the sensor of FIG. 3 shown rotated 90° relative to the view of FIG. 3.

The construction of FIG. 8 can be simpler to use than that of prior art FIG. 3. Specifically, in both the construction of FIG. 8 and that of FIG. 3, it is desirable to have transponder circuitry extending substantially horizontally with a ground surface, and a loop of conductive sensing material extending substantially downwardly into the ground. The transponder circuitry is preferably horizontal to the ground surface as such can enhance interaction of the transponder circuitry with an interrogator signal. The loop of sensing conductive material preferably extends downwardly into the ground as such can provide an extended surface which can be attacked by infesting termites. In the prior art embodiment of FIGS. 3 and 4, any horizontal configuration of the printed wiring board 42 and vertical configuration of the conductive sensing loop 41 is accomplished by having a relatively long and flexible substrate 40 bent within receptacle 14 (receptacle 14 is not shown in the embodiment of FIGS. 3 and 4). If the bend is too severe, circuitry of loop 41 (which is formed on substrate 40) will be broken. Accordingly, it is difficult to accomplish a horizontal orientation of the board 42 and a vertical orientation of conductive loop 41. In contrast, the horizontal configuration of transponder circuitry 180 and vertical configuration of sensing loop 118 of the embodiment of FIGS. 6–8 is accomplished by having the transponder circuitry connected to sensing loop 118 through a pair of prongs extending parallel to the sensing loop and perpendicular to the transponder circuitry.

Figure 9:
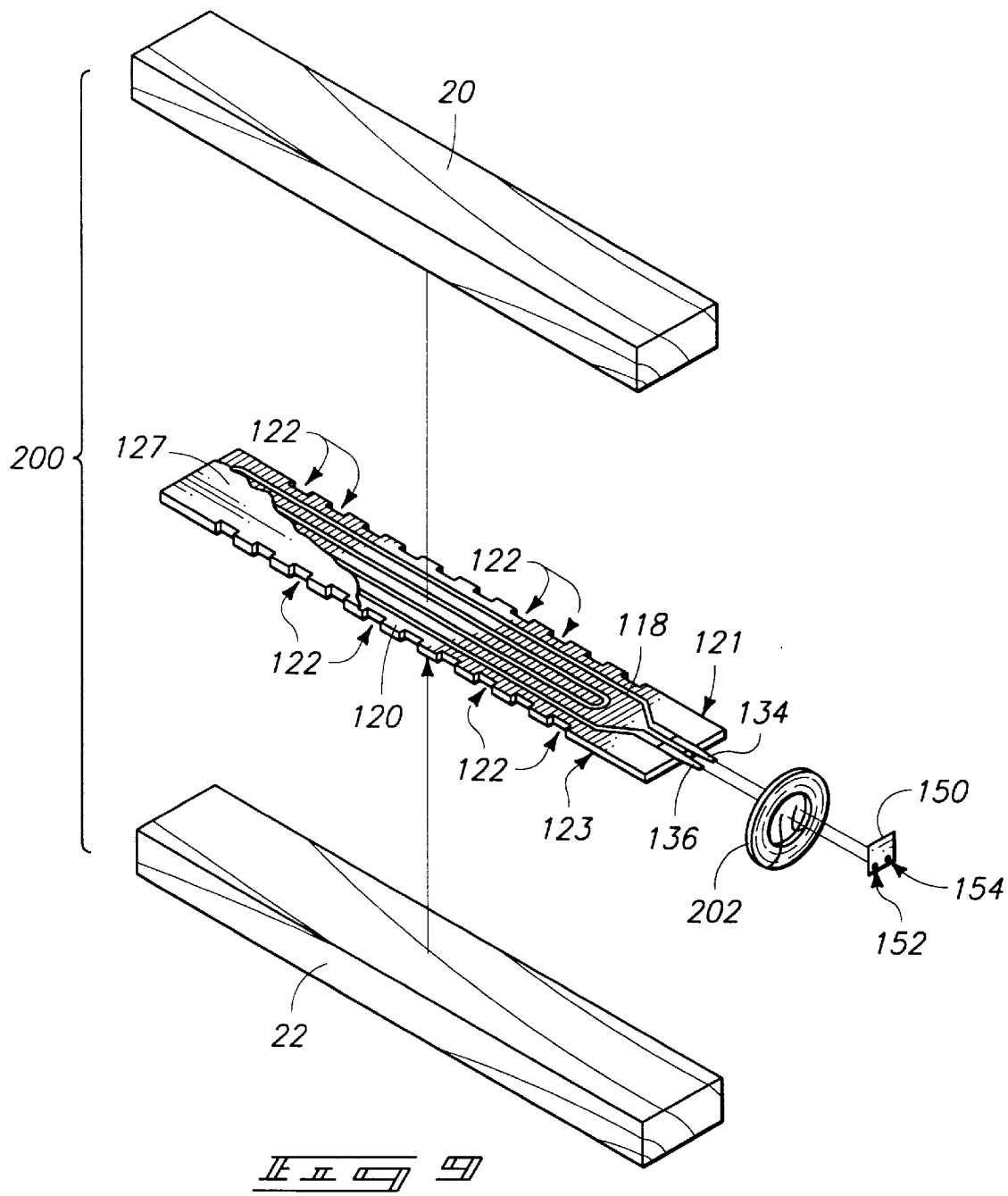
FIG. 9 is a diagrammatic, perspective view of a disassembled components of a termite-sensing device in accordance with a second embodiment of the present invention.

Another embodiment of the present invention is described with reference to FIGS. 9–12. Referring to FIG. 9, a termite sensing assembly 200 is shown in a disassembled view. Assembly 200 is similar to the assembly 160 described above with reference to FIG. 6, in that assembly 200 comprises a first wooden block 20, a second wooden block 22, a substrate 120 having circuitry 118 provided thereon, and a circuit board 150. Assembly 200 differs from assembly 160 in that there is no provision of a holder 110. Also, assembly 200 differs from assembly 160 in that a loop antenna 202 is illustrated as part of assembly 200. Loop antenna 202 is configured to be used with transponder circuitry associated with board 150.

Figure 10:
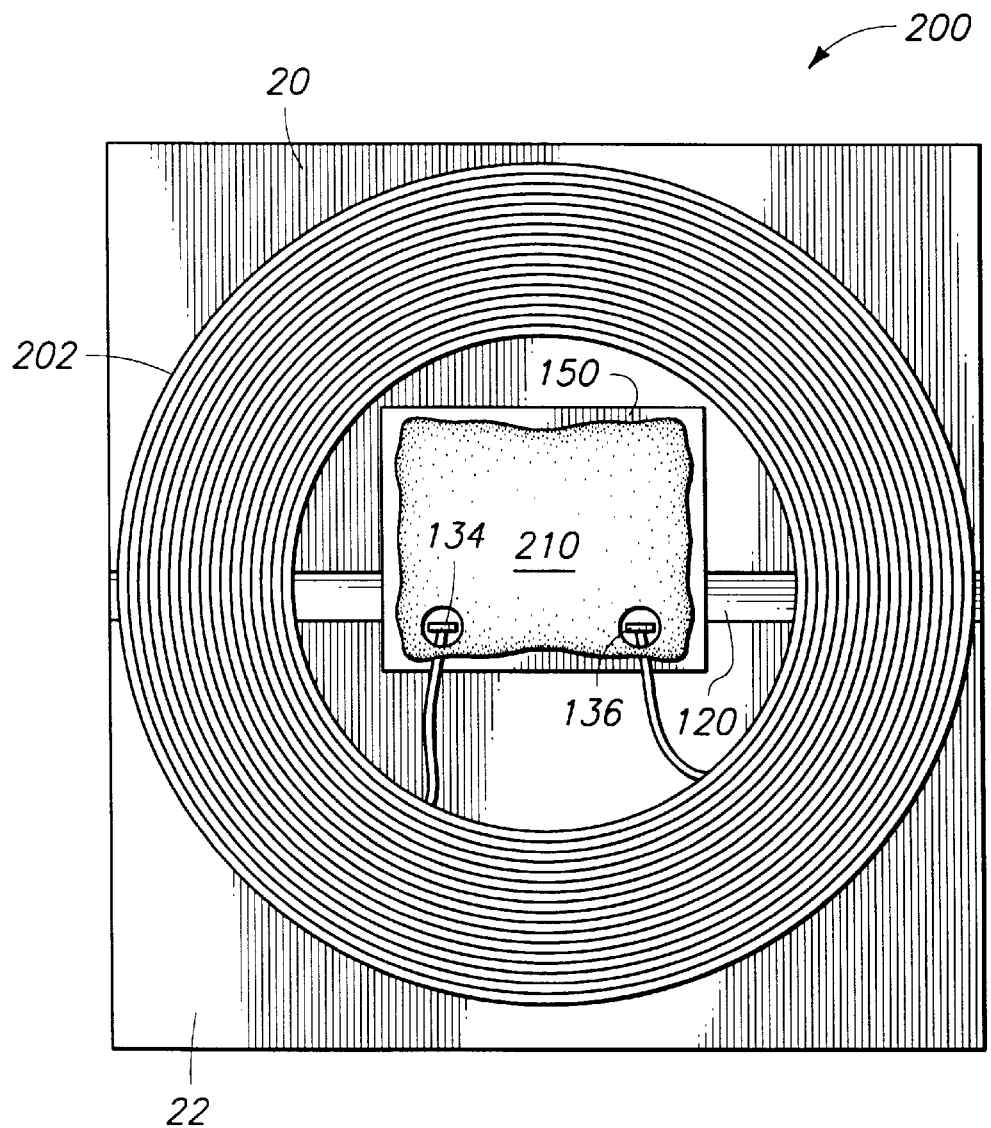
FIG. 10 is a diagrammatic end view of an assembly comprising the components of FIG. 9.

Referring to FIG. 10, assembly 200 is shown assembled. Antenna 202 and circuit board 150 rest on blocks 20 and 22, and substrate 120 is provided between blocks 20 and 22. Prongs 134 and 136 extend upwardly from substrate 120 and through orifices 152 and 154 (not shown) of circuit board 150. In the shown embodiment, an encapsulant 210 is provided over circuitry (not shown) on circuit board 150 to cover and protect such circuitry. In other embodiments (not shown) such encapsulant can be replaced with other protective materials over board 150, such as, for example, a molded cover. Prongs 132 and 134 can be adhered to the circuitry on circuit board 150 by solder. Such solder can also adhere and electrically connect circuit board 150, antenna 202, and circuitry 118 (FIG. 9) to one another. To further retain assembly 200 together, blocks 20 and 22 can be fastened to one another with, for example, staples or glue.

Figure 11:
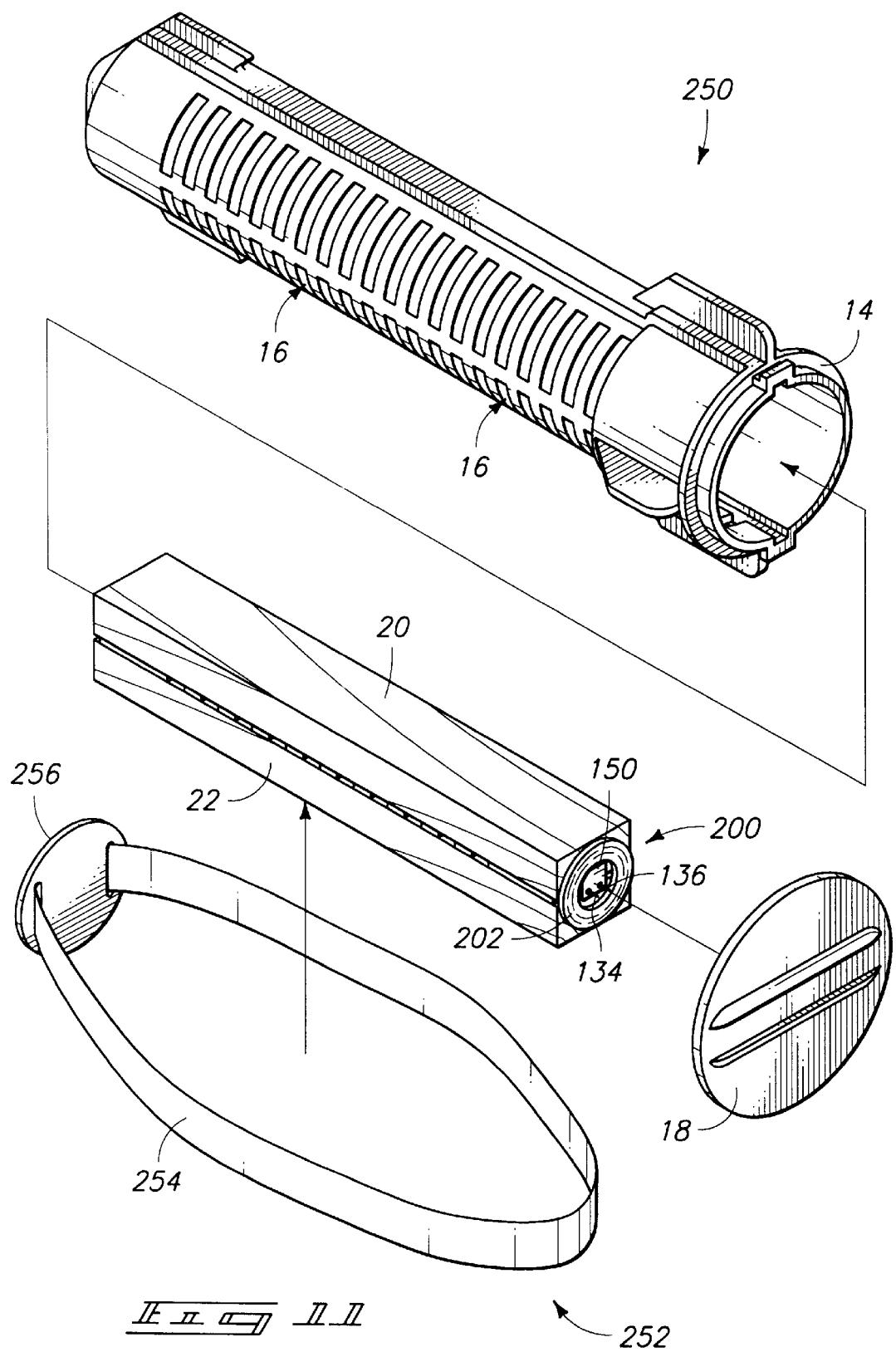
FIG. 11 is a diagrammatic, perspective view of a disassembled termite sensing device comprising the components of FIGS. 9 and 10.
Figure 12:
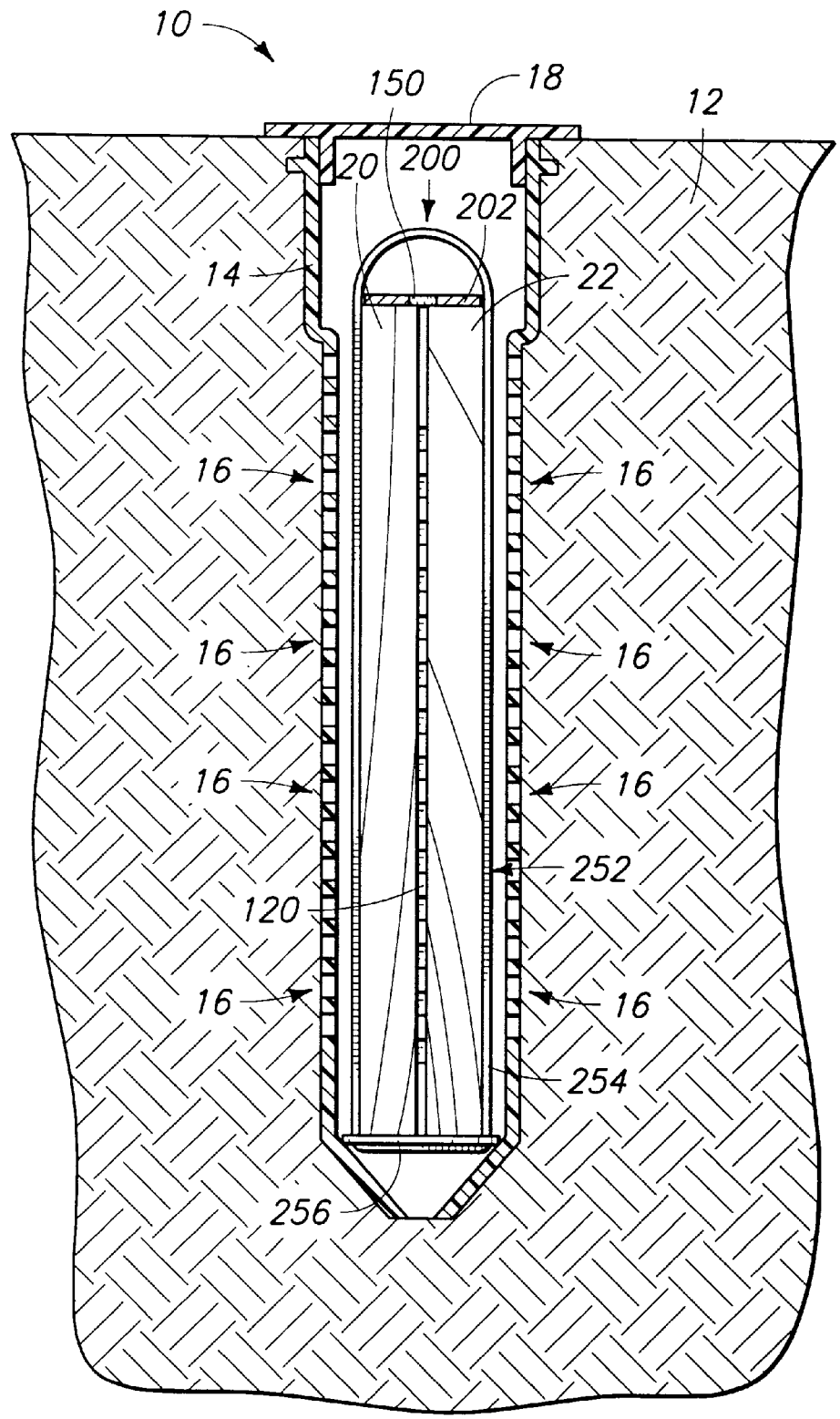
FIG. 12 is a diagrammatic, cross-sectional view of the termite sensing device of FIG. 11 in an assembled configuration and embedded in the ground.

FIG. 11 illustrates a disassembled device 250 comprising the assembly 200 of FIG. 10. Device 250 comprises a receptacle 14 and a lid 18 configured to be provided over receptacle 14. Device 250 further comprises a holder 252 for holding assembly 200 within receptacle 14. Holder 252 comprises a strap 254 joined to a shelf 256. In operation, assembly 200 is placed on shelf 256 and within strap 254. Holder 252 and assembly 200 are then inserted into device 14. Assembly 200 rests on shelf 256 within receptacle 14. Subsequently, assembly 200 can be withdrawn from receptacle 14 by pulling on strap 252. FIG. 12 illustrates a cross-sectional view of an assembled device 250 inserted within the ground 12.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A termite sensing device, comprising:

at least one wooden block;

a conductive loop proximate the wooden block, the conductive loop comprising a conductive material which includes particles of carbon; and an electrical circuit comprising the conductive loop as a first circuit component and further comprising a transponder as a second circuit component, the transponder being configured to emit a first signal if the conductive loop continuous and a second signal if the conductive loop is broken, the second signal being different than the first signal.

2. The device of claim 1, wherein:

the at least one wooden block is at least two wooden blocks separated by a gap; and at least a portion of the conductive loop is within the gap.

3. The device of claim 1 wherein the conductive loop comprises a carbon-particle-containing ink.

4. The device of claim 1 wherein the conductive material of the loop consists essentially of the particles of carbon.

5. The device of claim 1 wherein the conductive material of the loop comprises a mixture of metal-containing particles and the particles of carbon.

6. The device of claim 1 further comprising:

an insulative protective material over the conductive loop; and a termite attractant over the conductive loop.

7. The device of claim 6 wherein the termite attractant is a pheromone.

8. A termite sensing device, comprising:

at least two wooden blocks;

a planar conductive loop between the wooden blocks, the planar conductive loop extending along a first plane and comprising a conductive material which includes carbon particles, the planar conductive loop comprising two ends, the wooden blocks and planar conductive loop forming a composite block having an outer periphery;

a pair of prongs, a first of the pair of prongs extending from one of the two ends of the conductive loop and a second of the pair of prongs extending from an other of the two ends of the conductive loop, the first and second prongs extending outwardly beyond the outer periphery of the composite block; and a circuit board having circuitry supported thereby and a pair of orifices extending therethrough, the prongs extending through the orifices to electrically connect the circuitry supported by the circuit board to the planar conductive loop.

9. The device of claim 8 wherein the loop comprises a carbon-particle-containing ink.

10. The device of claim 8 wherein the conductive material of the loop consists essentially of the carbon particles.

11. The device of claim 8 wherein the conductive material of the loop comprising a mixture of metal-containing particles and the carbon particles.

12. The device of claim 8 further comprising:

an insulative protective material over the conductive loop; and a termite attractant over the conductive loop.

13. The device of claim 12 wherein the termite attractant is a pheromone.

14. A method of forming a termite sensing device, comprising:

forming a conductive loop over a substrate by printing an ink on the substrate, the ink comprising carbon particles;

placing the loop between a pair of wooden blocks; and providing a transponder in electrical connection with the loop of conductive material and configured to transpond a first signal if the loop is broken and a second signal if the loop is not broken, the first signal being different than the second signal.

15. The method of claim 14 wherein the conductive loop is formed by screen printing the ink onto the substrate.

16. The method of claim 14 wherein the ink comprises metal-containing particles in addition to the carbon particles.

* * * * *